United States Patent [19]
Weil et al.

[11] Patent Number: 5,071,894
[45] Date of Patent: Dec. 10, 1991

[54] FLAME RETARDANT POLYAMIDES

[75] Inventors: Edward D. Weil, BK Hastings-on-Hudson; Navin G. Patel, Farmingdale, both of N.Y.; Robert M. Leeuwendal, Maastricht, Netherlands

[73] Assignee: Stamicarbon B.V., AC Geleen, Netherlands

[21] Appl. No.: 562,859

[22] Filed: Aug. 3, 1990

[51] Int. Cl.⁵ .................. C08K 5/5333; C08K 5/09; C08K 3/38; C08K 3/24; C08K 3/22

[52] U.S. Cl. .................................. 524/127; 524/398; 524/405; 524/414; 524/415; 524/431; 524/492; 524/493; 524/417; 524/445

[58] Field of Search ............ 524/431, 405, 415, 414, 524/492, 493, 127, 398, 417, 445; 525/395, 432, 425

[56] References Cited
U.S. PATENT DOCUMENTS

| | | | |
|---|---|---|---|
| 3,810,861 | 5/1974 | Tacke et al. | 524/405 |
| 3,825,629 | 7/1974 | Hofer et al. | 524/126 |
| 3,929,940 | 12/1975 | Mayerhoefer et al. | 524/127 |
| 4,062,828 | 12/1977 | Herwig et al. | 524/126 |
| 4,137,212 | 1/1979 | Theysohn et al. | 524/431 |
| 4,600,741 | 7/1986 | Aycock et al. | 524/139 |
| 4,612,353 | 9/1986 | Andrews et al. | 525/432 |
| 4,657,987 | 4/1987 | Rock et al. | 525/432 |
| 4,659,763 | 4/1987 | Gallucci et al. | 524/359 |
| 4,861,828 | 8/1989 | Waggoner | 525/4,137,212 |
| 4,866,114 | 9/1989 | Taubitz et al. | 524/100 |
| 4,888,370 | 12/1989 | Freitag et al. | 524/100 |
| 4,933,386 | 6/1990 | Nitoh et al. | 524/127 |

Primary Examiner—Veroncia P. Hoke
Attorney, Agent, or Firm—Cushman, Darby & Cushman

[57] ABSTRACT

A flame retardant polyamide composition including flame retardant effective amounts of (a) an iron compound and (b) a char forming thermoplastic polymer having aromatic groups in the backbone. A char stabilizing compound (c) may also be present. In a preferred embodiment (b) is a polyphenylene ether. In a preferred embodiment, (c) is anhydrous zinc borate or a wollastonite.

28 Claims, No Drawings

FLAME RETARDANT POLYAMIDES

BACKGROUND OF THE INVENTION

The present invention relates to flame retardation of polyamides with particular regard to non-halogen flame retardants.

Flame retardation of thermoplastic polyamides by addition of various relatively low molecular weight (i.e. non-polymeric) organic additives, frequently together with antimony oxide, is known in the art. Typical organic additives include polybrominated aromatic hydrocarbons and ethers, as well as polychlorinated polycyclic hydrocarbons. These additives are not, however, wholly satisfactory because they generate smoke and corrosive hydrogen halides upon burning, and in some cases are subject to toxicological and environmental concerns. They also require sufficiently high loading so as to cause significant loss of some of the desirable physical properties of the polyamide.

Phosphorus compounds have also been used to flame retard thermoplastic polyamides. However, they are relatively inefficient and tend, in many cases, to cause undesired plasticization as well as degradation during processing. Red phosphorus has been used, but poses some handling hazard and can cause evolution of some phosphine during processing or thereafter.

Polyamides processed at lower temperatures can be flame retarded with ammonium polyphosphate or organic phosphates, but nylons processed at higher temperatures, such as above 200° C. are damaged by such additives, probably due to acid formation. It has been especially difficult to flame retard nylon 4,6 which is processed above 300° C., since only a few aromatic halogen additives (which entail the problem mentioned above) have enough stability. Furthermore, it has not been possible to find an available phosphorus-based flame retardant additive with enough stability or inertness towards the polyamide.

One object of the present invention is to provide a non-plasticizing, non-corrosive and non-degrading flame retardant additive for thermoplastic polyamides. Such additives are provided particularly for polyamides processed above 200° C. up to the temperature of unacceptable decomposition of the polymer itself, which for the most stable polyamides, may be as high as 400°–500° C. The present invention is especially useful for flame retarding nylon 4,6 which is processed at above 300° C.

BRIEF SUMMARY OF THE INVENTION

The present invention includes at least one thermoplastic polyamide to which a high flame retardancy is imparted by introducing components comprising flame retardant effective amounts of:

(a) an iron compound, preferably being substantially water insoluble; and (b) a char forming organic compound, preferably a thermoplastic polymer including aromatic groups in the backbone. The thermoplastic polymer is substantially stable and substantially free of volatile components at the processing temperature of the polyamide.

Another embodiment of the present invention further includes (c) a char stabilizing material, preferably a substantially water insoluble anhydrous borate, a low melting glass or a fibrous inorganic material.

A further embodiment includes a phosphorus compound having sufficient volatility to effect vapor phase flame suppression action.

The use of iron compounds as flame retardants is well known in halogen systems but it has been disclosed in the literature that iron compounds are relatively useless as flame retardants in the absence of halogen. Nangrani et al., Plastics Compounding 1988, 11 (2) pp. 27, 29–31 report that ferric oxide actually increases flammability of polycarbonate, and Hirschler, Polymer 1984, 25 (3), 405–411 reports the ineffectiveness of iron oxide as a flame retardant in the absence of halogen.

Surprisingly, the present invention provides highly effective flame retardancy despite being substantially halogen free.

Blends of polyphenylene oxides, a char forming polymer, with polyamides are well known, being described, for example, by Aycock, U.S. Pat. No. 4,600,74 and Galluci et al., U.S. Pat. No. 4,659,763. The use of polyphenylene oxides as a flame retarding component in low amounts in polyamides is also known per se, for example as taught by Freitag in U.S. Pat. No. 4,888,370 (Dec. 1989) (German Application 3614899, May 2, 1986). However, by use of this component alone, only feeble increases in flame retardancy have been achieved. Moreover, it has not hitherto been possible to reach high levels of flame retardancy such as an oxygen index of 35 or UL 94 V-O in thin sections without use of organic halogen or phosphorus additives as boosters, as taught for example by Taubitz et al., U.S. Pat. No. 4,866,114 (1989).

The use of low melting glasses as flame retardants has some precedent in publications of R.E. Myers et al., J. Fire Sci., (1985) 3, 415–431 and 432–449. Zinc borate, usually as a hydrate, has been well known as flame retardant and smoke suppressant additive and indeed has been commercially used as such on a large scale, mostly in polyvinyl chloride. The use of zinc borate as a flame retardant component in polyamides has also been known per se, for example as taught by Williams in U.S. Pat. No. 4,055,912 (1985). However, all of these zinc borate applications have been in halogen-containing polymer systems or in the hydrated form as a water release agent. It has not been recognized hitherto that zinc borate in anhydrous form would be a useful flame retardant component in any non-halogen systems.

The advantageous combination of certain iron compounds, a char forming polymer such as polyphenylene ether, and optionally a char stabilizing material such as anhydrous zinc borate in thermoplastic polyamides to achieve a high level of flame retardancy at low total additive levels has not hitherto been known or suggested. The interactions of the present components show strong and highly useful synergistic results (positive interaction causing greater than additive result) which could not have been predicted. The effectiveness of the present invention in the substantial absence of halogen is particularly surprising and unexpected.

DETAILED DESCRIPTION OF THE INVENTION

The thermoplastic polyamides of the present invention broadly include any substantially non-crosslinked polymer having a multiplicity of amide linkages, i.e. C—C(=O)—N—C linkages. Such polyamides thus encompass condensation polymers made, for instance, by polymerizing a monoaminomonocarboxylic acid or lactam thereof or by condensation polymerization of substantially equimolar amounts of a diamine or derivative thereof (such as a diisocyanate) with a dicarboxylic acid or derivative thereof (such as a diester or dichloride), or by the condensation polymerization of a diamine salt of a dicarboxyl acid. The term polyamide in this context includes homopolyamide, copolyamide, terpolyamide, a copolymer with one or more other monomers by copolycondensation or graft polymerization and mixtures of two or more of the aforementioned polymers.

The invention exhibits its best advantage in those polyamides or nylons which are processed at high temperatures, such as above 200° C. Such polyamides include nylon 6, nylon 6,6, nylon 11, nylon 12, nylon 4,4, nylon 6,3, nylon 6,4, nylon 6, 10 and nylon 6,12 for example. These names of polymers are well known in the art, and defined for instance in the article on polyamides in the Encyclopedia of Polymer Science & Engineering, 2nd Edition. The most preferred nylon for use in the invention is nylon 4,6 (the polyamide derived from 1,4-butane diamine and adipic acid). When employed with the present invention, nylon 4,6, can be flame retarded without degradation, thus providing great advantages as a solvent-resistant flame retardant molding resin having excellent thermomechanical properties.

The iron compound for use as additive (a) in the invention is any substantially water insoluble compound of ferric or ferrous iron, such as ferric oxide, ferrous oxide, $Fe_3O_4$, ferric carbonate, ferric borate, ferric phosphate, ferrous phosphate, ferric silicate, ferruginous clays (ferric aluminosilicates sometimes with other metals such as calcium), iron compounds such as iron boride, iron sulfide, iron phosphide and iron carbide, iron salts of organic acids such as phthalic, terephthalic or oxalic acids and bi- or more metallic oxides such as iron-molybdenum oxide. The iron compounds are substantially stable and substantial non-volatile at the processing temperature of the polyamide. The preferred iron compounds are ferric oxides, ferric silicates, ferric phosphates, and ferruginous clays having over about 3% iron content expressed as $Fe_2O_3$. It is preferred that the iron compound have a particle size below about 50 microns and even more preferred that it be below 10 microns. Compounds having a high surface due to the small particle size, show advantages including good flame retardancy, if used in a low concentration.

The amount of the iron compound (a) is broadly from about 0.2% to about 40%, preferably from about 2% to about 20% by weight of the total composition. It will be evident to one skilled in the art of polymer compounding that the exact amount will depend on the degree of flame retardancy required, and for a given level of flame retardancy, the amount of (a) can be lower as the amount of additives (b) and optionally (c) is higher, and conversely.

The char forming organic compounds (additive (b)), include thermoplastic polymers containing aromatic groups. Additive (b) is preferably a polymer having aromatic rings in the backbone. The polymer is substantially stable and substantially free of volatile components at the processing temperature of the polyamide. Such polymers include aromatic polysulfides, polysulfones, polyketones, polyimides, polyetherimides and polyarylates. Examples are polyphenylene sulfides, polyphenylene sulfones and polyphenylene ethers.

Additive (b) is more preferably polyphenylene ethers (PPE), also known as polyphenylene oxides (PPO). Because of the ease of processing with high melting polyamides polyphenylene ether is particularly preferred. PPE also show excellent char forming characteristics.

The polyphenylene ethers include those polymers derived by oxidative polymerization of 2, 6-dimethylphenol or a 2,6-dimethylphenol/2,3,6-trimethylphenol mixture, these being commercially available polymers having excellent stability at the processing temperature of the polyamides, and reasonable miscibility therewith. These also encompass such polyphenylene ethers that are modified to improve anhydride, grafting or the like, as is known in the art of polymer blending. The polyphenylene ethers of component (b) include the modified PPE's as described in U.S. Pat. Nos. 4,654,405 and 4,888,397.

The polyphenylene ethers for use in the invention comprise a well known class of polymers, the preparation of which is described for example in U.S. Pat. Nos. 3,256,357, 3,257,358, 3,306,874, 3,306,875, 3,914,266 and 4,028,34. They are typically prepared by oxidative coupling, using oxygen and metal catalysts such as copper compounds, of at least one monohydroxyaromatic compound, particularly suitable ones being 2,6-xylenol and 2,3,6-trimethylphenol.

Suitable polyphenylene ethers may also be modified with side chain substituents or end groups which modify properties such as molecular weight, viscosity, impact strength, or blendability, with other polymers such as polyamides. Side chain modified polyphenylene ethers are described in the patent literature and may be prepared by grafting onto the polyphenylene ether in known manner such vinyl monomers as acrylonitrile, styrene and maleic anhydride. Other suitable polymers are the end-group modified polyphenylene ethers in which the modifying agent is reacted in known manner with the hydroxy groups of one or more polyphenylene ethers. The polyphenylene ethers as a broad class have molecular weights within the range of about 2,000-100,000. Either low or high molecular weight polyphenylene ethers may be used in the present invention. The state of division of the polyphenylene ether is not critical since it typically fluxes with the polyamide during blending of the composition of the invention, however, for convenience in blending, it is preferably in the form of powder, granules, flakes, beads, or diced cubes.

The amount of the additive (b) such as polyphenylene ether, is broadly from about 0.2% to about 50%, preferably from about 2% to about 40%. It will be evident to one skilled in the art of polymer compounding that the exact amount will depend on the degree of flame retardancy, the amount of (b) can be lower as the amount of additives (a) and optionally (c) is higher, and conversely.

The char stabilizing material (c) is preferably a substantially water insoluble anhydrous borate, a low temperature melting glass, or an inorganic (e.g., mineral) fibrous material. The glass is more preferably a water insoluble borate low melting glass. Low melting glasses are for instance lead borate glass and alkali phosphate glass having melting points of about 200°-600° C. and preferably 300°-500° C. They are commercially available as solder glasses, frits and glazes. Such glasses include those reported by R.E. Myers, cited before and incorporated by reference in its entirety herein. The glasses of component (c) also include compounds having a low melting glass behavior such as borophosphates.

The borate for use as component (c) may be any borate of zinc, iron or manganese, but preferably zinc; for example, $Zn_2B_6O_{11}$, $ZnB_2O_4$, or $Zn_3B_4O_9$. For use in nylons processed at above 200° C. and especially for use in nylon 4,6, it is preferred that the zinc borate be substantially anhydrous to avoid hydrolytic degradation of the polyamide during processing. It is preferred that the zinc borate be finely divided, at least below about 50 microns and preferably below about 10 microns, the smaller, the better the activity.

As fibrous material preference is given to short noncombustible, inorganic, natural or synthetic mineral fiber material, for instance wollastonite, a fibrous calcium silicate. The fibers have a length shorter than 5 millimeters and diameter less than 50 microns.

The amount of (c) is broadly from about 0.2% to about 40%, preferably from about 2% to about 20%. It will be evident to one skilled in the art of polymer compounding that the exact amount will depend on the degree of flame retardancy required, and for a given level of flame retardancy, the amount of (c) can be lower as the amount of additives (a) and (b) is higher, and conversely. The amount of thermoplastic polyamide is at a minimum, 20% by weight of the total composition.

The present invention may optionally include a phosphorus compound present in an effective amount of 0.2-20% by weight, having sufficient volatility to effect vapor phase flame suppression action. This is most advantageous with nylon 6, which thermally depolymerizes to volatile caprolaotam. The vapor phase inhibitor suppresses flaming drip. The data in the below examples shows that a diphosphate only improved the LOI and burning time a little but it overcame flaming drip, which means the difference between a VI and a V2 rating in the UL 94 test.

Alternatives to the aforementioned diphosphate include: triaryl phosphates, diaryl hydrocarbylphosphonates, aryl dihydrocarbylphosphinates, and trihydrocarbylphosphine oxides, the hydrocarbyl group being unsubstituted or substituted by thermally stable radicals such as halogen, methoxy, or cyano. Examples include triphenyl phosphate, diphenyl cresyl phosphate, trixylenyl phosphate, diphenyl isopropylphenyl phosphate, diphenyl t-butylphenyl phosphate, tetraphenyl m-phenylene diphosphate, diphenyl methylphosphonate, tetraphenyl ethylenediphosphonate, phenyl diphenylphosphinate, triphenylphosphine oxide, and tris (2-cyanoethyl)phosphine oxide.

The method of blending the ingredients of the invention can be conducted by any means suitable for the uniform dispersion of particulate solids, such as mixing in a Banbury mixer or in an extruder.

The polymer mixtures of the invention may also have other ingredients such as pigment, stabilizers, processing aids, coupling agents, lubricants, mold release agents, and electroconductive additives. Likewise they may contain reinforoing additives such as glass fibers, mineral fibers, carbon fibers, aramide fibers, talc, mica, gypsum, wollastonite, or the like. Minor amounts of other thermoplastics may also be admixed with the nylon, for example impact modifiers such as shell-core acrylic interpolymers.

Other flame retardants such as phosphorus and halogen containing additives can be present but an important feature of the present invention is that it obviates the need for halogenated flame retardant.

EXAMPLES

The present invention is further illustrated, but not limited, by the following examples, wherein (1) different levels of the three components (a), (b) and (c) were admixed thoroughly into nylon 4,6 (nylon 4,6, STANYL TW 300 of DSM, The Netherlands, $n_{rel} = 3.2$) using a laboratory-scale mixing extruder (Maxwell screwless mini-extruder of Custom Scientific Instrument Corporation, New Jersey, USA);

(2) the flammability was determined by limiting oxygen index (LOI) (ASTM D-2863); and (3) by measuring burn time of extruded rods in a UL (Underwriter Laboratories) 94 configuration (bottom ignition by a standard burner flame for 2 successive 10 sec. intervals, with averaging of the afterflame time).

Some comparative materials, not within the invention, are also included as Examples 1, 3, 6, 14, 15, 19, 20, 26 and 29. All component (a) and (c) materials were below 50 micron particle size, some much finer, as shown in footnotes of the following Tables and 2.

TABLE 1

| Example No. | Comp. (a) Identity | (wt. %) | Comp. (b) Identity | (wt. %) | Comp. (c) Identity | (wt. %) | LOI [%] | Burning time (sec.) |
|---|---|---|---|---|---|---|---|---|
| 1 | none | | PPE | 20 | none | | 24.8 | 36 |
| 2 | $Fe_2O_3^e$ | 13 | PPE | 10 | none | | 32.8 | 18 |
| 3 | $Fe_2O_3^e$ | 20 | none | | none | | 25.7 | 25 |
| 4 | $Fe_2O_3^e$ | 8 | PPE | 10 | none | | 31.2 | 14 |

$^e$ = a 95-97% $Fe_2O_3$ red pigment, Mobay 130 M ®, <5 micron
PPE = a General Electric poly(2,6-dimethylphenylene) ether.

These examples clearly show the synergistic flame retarding effect of the combination of (a) and (b).

TABLE 2

| Example No. | Comp. (a) Identity | (wt. %) | Comp. (b) Identity | (wt. %) | Comp. (c) Identity | (wt. %) | LOI [%] | Burning time (sec.) |
|---|---|---|---|---|---|---|---|---|
| 5 | $FePO_4$ | 8 | PPE | 10 | $Zn_2B_6O_{11}$ | 5 | 33.0 | 9 |
| 6 | $Zn_3(PO_4)_2$ | 8 | PPE | 10 | $Zn_2B_6O_{11}$ | 5 | 31.5 | burns |
| 7 | $Fe_2O_3^a$ | 4.4 | PPE | 10 | $Zn_2B_6O_{11}$ | 5 | 35.4 | 7 |
| 8 | $Fe_2O_3^b$ | 4.4 | PPE | 10 | $Zn_2B_6O_{11}$ | 5 | 35.8 | 8 |
| 9 | $Fe_2O_3^b$ | 8 | PPE | 10 | $FeBO_3$ | 5 | 35.6 | 13 |
| 10 | $Fe_2O_3^b$ | 8 | PPE | 10 | $Zn_2B_6O_{11}$ | 5 | 37.3 | 13 |
| 11 | $Fe_2O_3^e$ | 6 | PPE | 7.5 | $Zn_2B_6O_{11}$ | 3.7 | 36.4 | 10 |
| 12 | $Fe_2O_3^e$ | 8 | PPE | 10 | $Zn_2B_6O_{11}$ | 2.5 | 37.3 | 4 |
| 13 | $Fe_2O_3^e$ | 4 | PPE | 5 | $Zn_2B_6O_{11}$ | 2.5 | 36.1 | 11 |
| 14 | none | | PPE | 10 | $Zn_2B_6O_{11}$ | 5 | 29.6 | 33 |

TABLE 2-continued

| Example No. | Comp. (a) Identity | (wt. %) | Comp. (b) Identity | (wt. %) | Comp. (c) Identity | (wt. %) | LOI [%] | Burning time (sec.) |
|---|---|---|---|---|---|---|---|---|
| 15 | $Fe_2O_3^e$ | 8 | none | | $Zn_2B_6O_{11}$ | 5 | 25.7 | 29 |
| 16 | $Fe_2O_3^e$ | 8 | PPE | 10 | $Zn_2B_2O_4$ | 5 | 38.7 | 10 |
| 17 | $Fe_2O_3^e$ | 8 | PPE | 10 | $Zn_3B_49$ | 5 | 35.5 | 16 |
| 18 | Ferrosil$^d$ | 8 | PPE | 10 | $Zn_2B_6O_{11}$ | 5 | 36.7 | 10 |
| 19 | $FeBO_3$ | 8 | PPE | 10 | ZnO | 5 | 31.5 | burns |
| 20 | $Fe_2O_3^e$ | 8 | PPE | 10 | ZnO | 5 | 31.5 | 24 |
| 21 | $Fe_2O_3^c$ | 8 | PPE | 10 | $Zn_2B_6O_{11}$ | 5 | 37.3 | 13 |
| 22 | $Fe_2O_3^e$ | 8 | PPE | 10 | $Zn_2B_6O_{11}$ | 5 | 38.7 | 4 |
| 23 | $Fe_2O_3^e$ | 4 | PPE | 10 | $Zn_2B_6O_{11}$ | 5 | 37.5 | 5 |
| 24 | $Fe_2O_3^e$ | 8 | PPE | 5 | $Zn_2B_6O_{11}$ | 5 | 36.7 | 8 |
| 25 | $Fe_2O_3^e$ | 4 | PPE | 5 | $Zn_2B_6O_{11}$ | 5 | 36.2 | 17 |
| 26 | none | | none | | $Zn_2B_6O_{11}$ | 20 | 25.2 | burns |
| 27 | Fe clay$^f$ | 8 | PPE | 10 | $Zn_2B_6O_{11}$ | 5 | 39.4 | 18 |
| 28 | $Fe_3O_4^g$ | 4 | PPE | 10 | $Zn_2B_6O_{11}$ | 5 | 36.7 | 7 |
| 29 | $Al_2O_3^h$ | 4 | PPE | 10 | $Zn_2B_6O_{11}$ | 5 | 32.8 | burns |
| 30 | $Fe_2O_3^b$ | 8 | PPE | 10 | Woll G$^i$ | 5 | 31.2 | 5 |

Notes:
burns = did not extinguish
PPE = General Electric poly(2,6-dimethylphenylene) ether
$Zn_2B_6O_{11}$ = XPI 187 from U.S. Borax Co., 8-10 micron size
$a$ = an orange $Fe_2O_3$ pigment, Akron Chemical Co. E-4126
$b$ = a brown $Fe_2O_3$ pigment, Akron Chemical Co. E-4102
$c$ = a micaceous hematite pigment from Hoover Color Corp.
$d$ = a natural ferroaluminum silicate from Kaopolite Inc.
$e$ = a 95-7% $Fe_2O_3$ red pigment, Mobay 130M, <5 micron
$f$ = a red clay having 8% $Fe_2O_3$, 90% < 200 mesh
$g$ = a black pigment, from Mobay 318M
$h$ = a powdered neutral alumina from Fisher Scientific Co.
$i$ = Wollastokup G., a surface modified wollastonite, 37 microns.

EXAMPLE 31

Example 23 was repeated with nylon 6,6 instead of nylon 4,6. A burning time of 4 sec. was observed, however with flaming drips, which is suppressed by inclusion of 10% by weight of triphenylphosphine oxide.

EXAMPLE 32

Example 22 was repeated using nylon 6 instead of nylon 4,6. A formulation was prepared consisting of 67% nylon 6, 8% ferric oxide (pigment grade), 5% zinc borate (finely divided anhydrous), 10% poly (2,6-dimethylphenylene oxide), and 10% tetraphenyl p-phenylene diphosphate. The material was mixed and extruded to make rods. These were found to have an LOI of 31.0 and an average self-extinguishing time of 11 seconds under UL 94 test conditions with no flaming drip, which corresponds to a VI rating. Without the 10% diphosphate, the LOI was 30.2 and the average self-extinguishing time was 14 seconds; but there was flaming drip, so that the rating was only V2.

EXAMPLES 33 and 34

In a larger scale experiment the powdered constituents of the composition were dryblended in a tumbler and consequently processed on a double screw extruder (diameter 33 mm) at 300°-315° C. Test bars were injection-molded. Mean values for bars were taken.

showing that even with less than 15% flame retardant additives optimum results can be obtained.

The data given in the Tables show that a high degree of flame retardancy is not provided by even high loadings (20%) of representatives of (a), (b) or (c) used one at a time (Examples 1, 3 and 26). The three-component combinations of (a) plus (b) plus (c) consistently gave good fame retardancy results. Note that replacing the iron compound in (a) by a related zinc or aluminum compound gave inferior results. Likewise, replacing the borate in (c) by a related oxide gave inferior results.

To further quantify the interactions, computerized regression analysis was used to fit mathematical equations to the LOI data generated for combinations of $Fe_2O_3$, PPO and $Zn_2B_6O_{11}$ of Table 2 from a two level full-factorial design with center point, along with LOI data with each individual component and LOI data for the base polymer (intercept forced to the LOI for the polymer without any flame retardant additive). The goodness-of-fit of proposed equations was assessed by the computer-generated $r^2$ (coefficient of correlation) and F statistic, and t statistic for individual terms in the regression equation. The percentages of each component were designated as R for $Fe_2O_3$, P for PPO and Z for $Zn_2B_6O_{11}$. The best fit to the data was given by the equation:

$$LOI = 21.3 + 0.984r^{\frac{1}{2}} + 6.38P\kappa + 0.803Z\kappa - 1.268P + 0.287(RPZ)\kappa$$

| Example No. | Comp. (a) Identity | (wt. %) | Comp. (b) Identity | (wt. %) | Comp. (c) Identity | (wt. %) | LOI [%] | Burning time (sec.) |
|---|---|---|---|---|---|---|---|---|
| 33* | $Fe_2O_3^j$ | 5 | PPO | 5 | $Zn_2B_6O_{11}$ | 5 | 44 | 3 |
| 34* | $Fe_2O_3^j$ | 4 | PPO | 10 | $Zn_2B_6O_{11}$ | 5 | 42 | 3 |

*experiments with nylon 4.6 $n_{rel}$ = 3.2
j = very fine powder, 0.35 micron obtained from Johnson & Mathey, GB.

Due to the better mixing by double screw extruder compared to the laboratory apparatus, extremely good results with respect to flame retardancy are obtained, The coefficient of correlation $r^2$ is 0.9906, the F statistic is 488 (showing a good fit to the data) and the t statistics for each coefficient show high significance. The threeway interaction term is highly significant and leaving it out greatly diminished the goodness of fit of the equation to the data.

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

What is claimed is:

1. A flame retardant thermoplastic polyamide/composition comprising flame retardant effective amounts of:
   (a) an iron compound; and
   (b) a char forming thermoplastic polymer having aromatic groups in the backbone.

2. Composition according to claim 1, wherein component (a) is substantially water insoluble.

3. Composition according to claim 1 wherein (a) is chosen from the group consisting of iron oxides and substantially water insoluble iron salts.

4. Composition according to claim 1 wherein (a) is chosen from the group consisting of iron oxides, iron silicates, iron borates, iron phosphates and iron containing clay having over about 3% iron content.

5. Composition according to claim 1 wherein component (b) is substantially stable and substantially free of volatile components at the processing temperature of the polyamide.

6. Composition according to claim 1 which is substantially halogen free.

7. Composition according to claim 1 wherein the char forming polymer (b) is selected from the group consisting of polyetherimides, polyphenylene sulfides, polyimides, polyarylates, polyphenylene sulfones and polyphenylene ethers.

8. Composition according to claim 1 wherein the char forming polymer (b) is polyphenylene ether.

9. Composition according to claim 1 further including a char stabilizing material (c).

10. Composition according to claim 9 wherein (c) is selected from the group consisting of substantially water insoluble anhydrous borates, low melting temperature glasses and inorganic fibrous materials.

11. Composition according to claim 10 wherein the substantially water insoluble anhydrous borates include a borate compound selected from the group consisting of zinc borate, iron borate and manganese borate, with the proviso that (a) and (c) are not simultaneously iron borate.

12. Composition according to claim 10 wherein said inorganic fibrous material includes wollastonites.

13. Composition according to claim 1 wherein the amount of
   component (a) is between 0.2 and 40% by weight, and
   component (b) is between 0.2 and 50% by weight of the total composition.

14. Composition according to claim 9 wherein the amount of
   component (a) is between 0.2 and 40% by weight,
   component (b) is between 0.2 and 50% by weight, and
   component is between 0.20 and 40% by weight of the total composition, with the proviso that the amount of said thermoplastic polyamide is at least 20% by weight.

15. Composition according to claim 1, wherein the particle size of (a) is less than about 50 microns.

16. Composition according to claim 1 wherein the particle size of (a) is less than about 10 microns.

17. Composition according to claim 10 wherein the particle size of said anhydrous borates and low melting temperature glasses is less than about 50 microns.

18. Composition according to claim 9 wherein the particle size of said anhydrous borates and low melting temperature glasses is less than about 10 microns.

19. A flame retardant thermoplastic polyamide composition comprising flame retardant effective amounts of
   (a) an iron compound chosen from the group of an iron oxide, an iron silicate, an iron borate, an iron phosphate and an iron containing clay having over about 3% iron content,
   (b) a polyphenylene ether, and
   (c) anhydrous zinc borate
   in which
   the amount of (a) is between about 2% and about 20% by weight
   the amount of (b) is between about 2% and about 40% by weight, and
   the amount of (c) is between about 2% and about 20% by weight of the total composition,
   and the particle size of (a) is smaller than about 10 microns.

20. Composition according to claim 1 wherein the thermoplastic polyamide is processed at above 200° C.

21. Composition according to claim 1 wherein the thermoplastic polyamide is selected from the group consisting of nylon 6, nylon 6,6, nylon 11, nylon 12, nylon 4,4, nylon 6,3, nylon 6,4, nylon 6,10, nylon 6,12 and nylon 4,6.

22. Composition according to claim 1 wherein the thermoplastic polyamide is nylon 4,6.

23. Composition according to claim 9 further including a phosphorus compound having sufficient volatility to effect vapor phase flame suppression action.

24. Composition according to claim 23 wherein the phosphorus compound is present in an amount of 0.2–20% by weight.

25. Composition according to claim 23 wherein the phosphorus compound is a diphosphate compound.

26. Composition according to claim 23 wherein the phosphorus compound is a diphosphate compound or a compound selected from the group consisting of triaryl phosphates, diaryl hydrocarbylphosphonates, aryl dihydrocarbylphosphinates, and trihydrocarbylphosphine oxides, all of which having the hydrocarbyl group being unsubstituted or substituted by thermally stable radicals selected from the group consisting halogen, methoxy and cyano.

27. Composition according to claim 23 wherein the phosphorus compound is tetraphenyl p-phenylene diphosphate.

28. Composition according to claim 23 wherein the thermoplastic polyamide is nylon 6.

* * * * *

UNITED STATES PATENT AND TRADEMARK OFFICE
CERTIFICATE OF CORRECTION

PATENT NO. : 5,071,894
DATED : December 10, 1991
INVENTOR(S) : WEIL et al.

It is certified that error appears in the above—identified patent and that said Letters Patent is hereby corrected as shown below:

ON THE TITLE PAGE

[75] Inventors:

After "Weil", delete "BK".

Column 8, lines 35, change "fame" to --flame--;

line 55, change "LOI=21.3 + 0.984r½ + 6.38Pk + 0.803Zk - 1.268P +-" to --LOI=21.3 + 0.984R^½ + 6.38P^½ + 0.803Z^½ - 1.268P +--; and line 64, change "0.287(RPZ)k" to --0.287(RPZ)^½--.

Signed and Sealed this

Twenty-first Day of September, 1993

*Attest:*

BRUCE LEHMAN

*Attesting Officer*     *Commissioner of Patents and Trademarks*